(12) United States Patent
Wagner et al.

(10) Patent No.: US 7,562,648 B1
(45) Date of Patent: Jul. 21, 2009

(54) HIGH PRESSURE FUEL LINE WITH CONNECTION HEAD AND METHOD FOR FORMING

(75) Inventors: James Cletus Wagner, Angola, IN (US); Jerry Douglas Hooser, Corunna, IN (US)

(73) Assignee: Autoform Tool & Manufacturing, Inc., Fremont, IN (US)

( * ) Notice: Subject to any disclaimer, the term of this patent is extended or adjusted under 35 U.S.C. 154(b) by 60 days.

(21) Appl. No.: 11/679,983

(22) Filed: Feb. 28, 2007

(51) Int. Cl.
*F02M 55/02* (2006.01)
*F16L 27/04* (2006.01)

(52) U.S. Cl. .......................... 123/468; 285/261; 285/263

(58) Field of Classification Search .................. 123/456, 123/468, 469; 29/890.14, 890.144; 285/31, 285/45, 98, 146.1, 239, 261, 263
See application file for complete search history.

(56) References Cited

U.S. PATENT DOCUMENTS

| | | | |
|---|---|---|---|
| 2,497,441 A | 2/1950 | Detweiler | |
| 2,564,938 A * | 8/1951 | Warren | 285/95 |
| 3,449,937 A | 6/1969 | Dimmig | |
| 3,450,421 A * | 6/1969 | Harwell, Jr. | 285/24 |
| 3,698,745 A | 10/1972 | Mundt | |
| 3,712,645 A * | 1/1973 | Herter | 285/95 |
| 3,929,355 A * | 12/1975 | Sljusar | 285/39 |
| 4,029,345 A | 6/1977 | Romanelli | |
| 4,097,071 A * | 6/1978 | Crawford et al. | 285/94 |
| 4,139,221 A * | 2/1979 | Shotbolt | 285/18 |
| 4,669,761 A | 6/1987 | Huling | |
| 4,776,615 A * | 10/1988 | Young | 285/121.7 |
| 5,109,888 A | 5/1992 | Usui | |
| 5,269,629 A * | 12/1993 | Langner | 405/195.1 |
| 5,368,342 A * | 11/1994 | Latham et al. | 285/261 |
| 5,997,050 A | 12/1999 | Fleckenstein et al. | |
| 6,109,662 A * | 8/2000 | van Zuthem et al. | 285/146.2 |
| 6,158,781 A * | 12/2000 | Aaron, III | 285/23 |
| 6,374,806 B1 * | 4/2002 | Keeley et al. | 123/456 |
| 6,431,150 B1 * | 8/2002 | Pearlman et al. | 123/468 |
| 6,467,457 B1 * | 10/2002 | Lei et al. | 123/456 |
| 6,497,220 B1 * | 12/2002 | Boecking | 123/469 |
| 6,746,056 B2 * | 6/2004 | Palmer | 285/261 |
| 6,859,956 B2 * | 3/2005 | Mantyla et al. | 4/679 |
| 6,981,722 B2 | 1/2006 | Watanabe | |
| 7,237,808 B2 * | 7/2007 | Porter | 285/261 |
| 2006/0225281 A1 * | 10/2006 | Porter | 29/890.14 |
| 2006/0284421 A1 | 12/2006 | Fonville et al. | |
| 2007/0006848 A1 * | 1/2007 | Ricco et al. | 123/456 |

* cited by examiner

*Primary Examiner*—Thomas N Moulis
(74) *Attorney, Agent, or Firm*—Mary M. Moyne; Fraser Trebilcock Davis & Dunlap, P.C.

(57) ABSTRACT

A jointless connection head for a fuel line for use in a high pressure fuel connection assembly for a high pressure fuel system and a method for forming the connection head without brazing. The connection head has an essentially spherical outer surface with a liner located in an inner cavity in the connection head. The connection head is formed by expanding the center bore of the tubular body of the fuel line at one end. The center bore is expanded by moving the sidewall of the tubular body outward. The liner is then inserted into the expanded center bore and the sidewall of the tubular body is formed over the front side of the liner.

21 Claims, 4 Drawing Sheets

HIGH PRESSURE FUEL LINE WITH CONNECTION HEAD AND METHOD FOR FORMING

CROSS-REFERENCES TO RELATED APPLICATIONS

Not Applicable

STATEMENT REGARDING FEDERALLY SPONSORED RESEARCH OR DEVELOPMENT

Not Applicable

BACKGROUND OF THE INVENTION (1) Field of the Invention

The present invention relates to a connection head of a fuel line for use in a connection assembly used in a high pressure fuel system. In particular, the present invention relates to a connection head of a fuel line having a spherical outer surface with a liner. The present invention also relates to a method of forming a connection head having a spherical shape for use in a high pressure fuel system.

(2) Description of the Related Art

High pressure fuel lines are used in high pressure fuel systems to connect the various components of the system together. The connection head on the end of the fuel line is seated against the seating surface in the connection stub of the component. The fuel line is secured in place on the connection stub by a lock nut which applies a force to the connection head of the fuel line and moves the connection head into sealing connection against the seating surface of the connection stub of the component.

To reduce stress induced in the fuel line caused by the misalignment of the connection head of the fuel line and the seating surface of the connection stub of the fuel system component and to maintain the integrity of the sealing connection, connection assemblies for high pressure applications, such as high pressure fuel systems, use fuel lines having a connection head with a spherical shape. The connection head of the fuel line mates with the conical or curved sealing surface of the connection stub of the component of the fuel system to form a seal. The spherical shape of the connection head also allows for easier assembly of the connection assembly when there is misalignment between the fuel line and the fuel system component. Connection assemblies for high pressure fuel systems which use fuel lines having an end fitting having a spherical shape are described in U.S. Pat. No. 6,497,220 to Boecking and U.S. Patent Application No. 2006/0284421 to Fonville et al.

However, in the past, the connection head having the spherical shape was constructed by securing an end fitting having a spherical outer surface to the end of the fuel pipe. The end fitting was secured onto the fuel pipe by brazing or crimping. However, the attachment of the end fitting on the outside of the fuel line creates a join which is capable of become separated due to stress or misalignment and thus creates the potential for a leak in the fuel line. U.S. Pat. No. 3,449,937 to Dimmig shows a high pressure fuel line head formed by a two-slip cold forming process. However, this invention uses a heavy walled tube to form the spherical head. U.S. Pat. No. 5,997,050 to Fleckenstein et al. shows the use of cold forming to form a double cone coupling nipple formed in a relatively thin-walled steel tube. However, the conical area of the nipple has a wall thickness approximately double of the thickness of the remaining tube.

The related art has shown sealing ends or sealing heads which are formed with a continuous outer surface and which have an inner support ring or a filler ring in the inside of a sealing end or sealing head. Illustrative are U.S. Pat. No. 2,497,441 to Detweiler; U.S. Pat. No. 3,698,745 to Mundt; U.S. Pat. No. 4,029,345 to Romanelli; and U.S. Pat. No. 5,109,888 to Usui.

Detweiler describes couplings for use with pipes or hydraulic lines where a flare or bead is provided on the end part of the tubing which is inserted into the coupling body. When the bead is formed, an annular recess is left within the tubing. A filler ring is provided on the inside of the tubing within the recess. The filler ring fills the recess so that the internal surface of the filler ring is cylindrical and flush with the internal surface of the tubing.

Mundt describes an inverted flare type hose coupling having a conically shaped eyelet wall end supported against the sealing forces by a support ring. The exterior of the support ring includes a conical or tapered surface truncated by the radial end face of the outer end. The wall end does not extend over the radial end face of the outer end of the support ring. The support ring may include a cylindrical axial extension which internally supports the eyelet alignment portion.

Romanelli describes a pipe having a flanged and shanked seal ring inserted in the end portion. The seal ring includes a stem and a flanged head. The flanged head of the seal ring does not extend into the pipe.

Usui describes a high pressure metallic pipe having a connecting head with a flat and smooth inner peripheral surface. To form the pipe, a steel pipe of a large wall thickness is used. A sleeve washer is attached near the connecting end, and the end of the pipe is radially expanded outwardly using a mandrel member. The metallic ring is buried inside the radially expanded pipe. The cross section of the metallic ring may be semicircular, triangular or trapezoidal. Once the ring is in position, the peripheral wall of the radially expanded tube is pressed inwardly using a punch member having a die conforming to the contour of a head to form the head having the shape of a truncated cone. The metallic ring is buried in the annular groove formed in the inner peripheral surface of the pipe during the formation of the head. The metallic ring fills the annular groove so that the connecting head has a flat and smooth inner peripheral surface.

Also of interest are U.S. Pat. No. 6,981,722 to Watanabe and U.S. Pat. Application Publication No. 2007/0006848 to Ricco et al. which show connection assemblies for high pressure fuel systems.

Only of minimal interest is U.S. Pat. No. 4,669,761 to Ruling which shows a fitting for a pressurized fuel line which uses an expander inside the end of the tube to force the end of the tube against the fitting member in a very tight seal.

There remains the need for a connection head for a high pressure fuel line having a spherical shape where the outer surface of the fuel line is continuous and a liner is provided inside the connection head and for a method of forming the connection head, which is economical and eliminates the step of brazing or crimping.

BRIEF SUMMARY OF THE INVENTION

A connection head for a fuel line for use in a high pressure fuel connection assembly for a high pressure fuel system and a method for forming the connection head without brazing. The connection head has an essentially spherical outer surface with a liner located in an inner cavity in the connection head. The thickness of the sidewall of the connection head is essentially the same as the thickness of the sidewall of the remainder of the tubular body of the fuel line. The liner has a first part and a second part. The first part of the liner has an essentially spherical shape similar to the shape of the inner cavity. The second part of the liner extends outward from the first part and has a shape and size similar to the center bore of the tubular body of the fuel line. The liner has a center bore which extends through the first and second part on the liner. The center bore forms the passageway through the connection head into the center bore of the tubular body of the fuel line. The liner provides support for the connection head when forces are applied to the connection head to form the sealingly tight connection necessary for a high pressure fuel connection assembly.

The connection head is formed by expanding the center bore of the tubular body of the fuel line at one end so that the outer surface of the fuel line is continuous without any joints. The center bore is expanded by moving the sidewall of the tubular body outward. The liner is then inserted into the expanded center bore. Finally, the sidewall of the tubular body is formed over the front side of the liner. In one (1) embodiment the connection head is formed by cold forming. To form the connection head in one (1) embodiment, the tubular body of the fuel line is mounted in a clamp die. One end of the clamp die has a recess having a shape similar to the shape of the back side of the connection head. The tubular body is positioned in the clamp die so that the portion of the tubular body used to form the connection head extend into the recess. An expansion punch is then inserted into the opening in the end of the tubular body. The expansion punch moves sidewall of the tubular body outward and increases the size of the center bore adjacent the end of the tubular body. The expansion punch is moved into the center bore until the sidewall of the tubular body contacts the back wall of the recess in the clamp die. This forms the back side of the connection head and the back side of the inner cavity. The expansion punch is removed and the liner is inserted into the expanded center bore. The second part of the liner is inserted into the center bore first. The liner is inserted into the expanded center bore until the second part of the liner extends into the unexpanded center bore adjacent the back side of the inner cavity and the back side of the first part of the liner contacts the back side of the inner cavity. In another embodiment, the liner is used as the expansion punch. In this embodiment, expansion of the center bore of the tubular body and insertion of the liner are combined into a single step. Next a coin die is applied over the end of the tubular body. The coin die has a recess having a shape similar to the shape of the front side of the connection head. The coin die moves the sidewall of the tubular body inward toward the front side of the first part of the liner to complete the formation of the connection head.

The present invention relates to a high pressure fuel line which comprises a tubular body having opposed ends with an opening in each end and having a center bore extending therebetween with at least one of the ends of the tubular body having an essentially spherical outer shape with an essentially spherical inner cavity and a liner positioned in the spherical inner cavity and having a center bore aligned with the center bore of the tubular body.

Further, the present invention relates to a method for forming a connection head on an end of a high pressure fuel line, which comprises the steps of providing a tubular body having opposed ends with a sidewall extending therebetween and having a center bore with openings at each end, providing a liner having an essentially spherical shape and having a center bore with openings at each end, inserting the liner completely into the center bore of the tubular body through one of the openings in one of the ends of the tubular body so that the center bore of the liner is aligned with the center bore of the tubular body, and forming the sidewall at the one end of the tubular body over the liner so that the sidewall at the one end of the tubular body has an essentially spherical outer shape with an inner cavity having an essentially cylindrical shape.

The substance and advantages of the present invention will become increasingly apparent by reference to the following drawings and the description.

DETAILED DESCRIPTION OF THE INVENTION

All patents, patent applications, government publications, government regulations, and literature references cited in this specification are hereby incorporated herein by reference in their entirety. In case of conflict, the present description, including definitions, will control.

Figure 1:
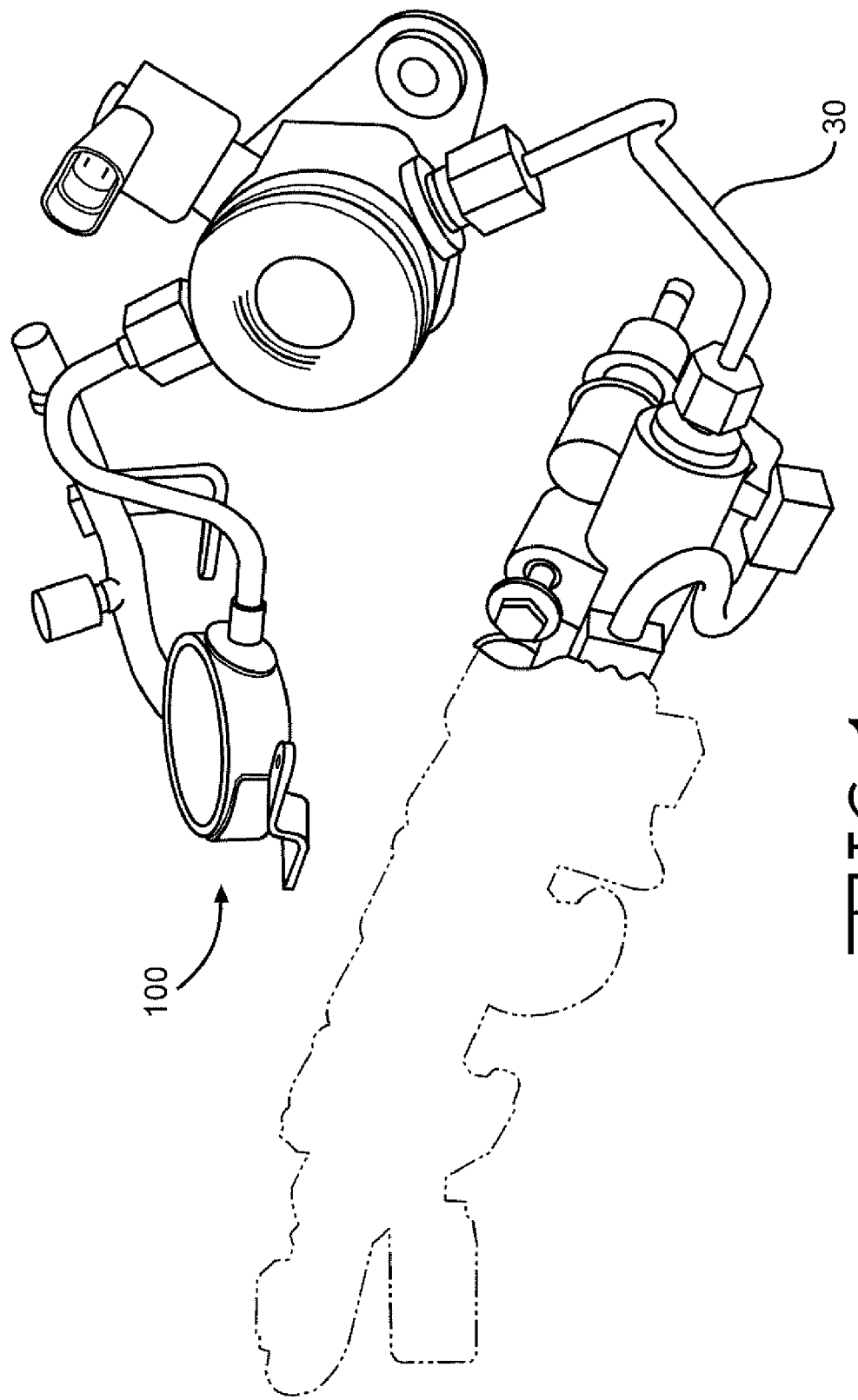
FIG. 1 is a perspective view of the high pressure fuel line 30 in a high pressure fuel system 100.

The fuel line 30 of the present invention is intended for use in a high pressure fuel system 100 (FIG. 1). The fuel line 30 includes a tubular body 32 having opposed ends 32A and 32B with a center bore 34 extending between the ends 32A and 32B and openings into the center bore 34 at both ends 32A and 32B. The fuel line 30 can be provided with a connection head 10 on one or both ends 32A or 32B of the tubular body 32 of the fuel line 30. The connection head 10 has an outer surface 10A and an inner cavity 12 within which is positioned a liner 20. The sidewall 36 of the tubular body 32 forms the outer surface 10A of the connection head 10 so that the outer surface of the fuel line 30 is continuous without any joints. The outer surface 10A of the connection head 10 has an essentially spherical shape with a truncated section adjacent the opening 32C in the connection head 10. The shape of the outer surface 10A of the connection head 10 is formed by deformation of the sidewall 36 of the tubular body 32 of the fuel line 30. The thickness of the sidewall 36 forming the connection head 10 is essentially the same as the thickness of the sidewall 36 for the remainder of the tubular body 32 of the fuel line 30. Deformation of the sidewall 36 of the tubular body 32 also forms the inner cavity 12 in the center bore 34 of the tubular body 32. In one (1) embodiment, the inner cavity 12 has a spherical shape.

Figure 3:
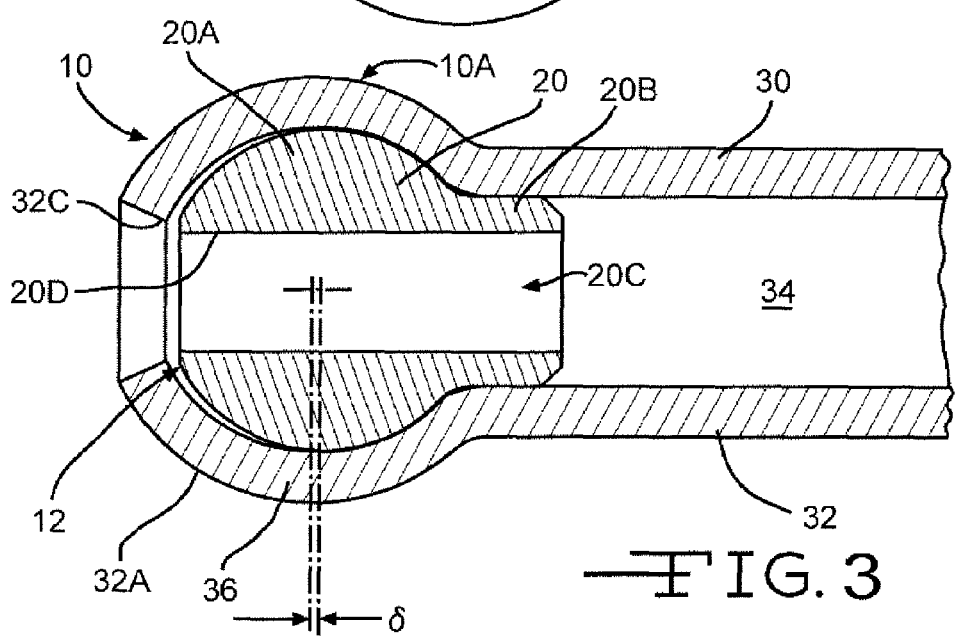
FIG. 3 is a cross sectional view of FIG. 2 along the line 3-3 showing the liner 20 positioned in the connection head 10 of the high pressure fuel line 30.

The liner 20 has a first part 20A and a second part 20B with a center bore 20C having openings 20D at each end extending through the first and second parts 20A and 20B (FIG. 3). The center bore 20C of the liner 20 provides the fluid passageway through the connection head 10 for the high pressure fuel line 30. The first part 20A of the liner 20 has an essentially spherical shape. The second part 20B has an essentially cylindrical shape and extends outward from the first part 20A. In one (1)

embodiment, the first part 20A has a truncated section opposite the second part 20B. The truncated section includes the opening 20D into the center bore 20C of the liner 20. The size of the truncated section is slightly greater than the diameter of the center bore 20C. In one (1) embodiment, the diameter of the truncated section of the first part 20A of the liner 20 is essentially equal to the outer diameter of the second part 20B of the liner 20 which is essentially equal to the diameter of the center bore 34 of the tubular body 32. In one (1) embodiment, the opening 20D into the center bore 20C in the first part 20A of the liner 20 is chamfered. In one (1) embodiment, the first part 20A has a size and shape essentially the same as the size and shape of the inner cavity 12 in the center bore 34 of the tubular body 32 so that the first part 20A of the liner 20 completely fills the inner cavity 12 and the liner 20 contacts the sidewall 36 forming the inner cavity 12. In one (1) embodiment, the shape of the back side of the inner cavity 12 is similar to the shape of the back side of the first part 20A of the liner 20 adjacent the second part 20B of the liner 20 so that when the liner 20 is positioned in the inner cavity 12, the sidewall 36 of the tubular body 32 forming the back side of the inner cavity 12 contacts the back side of the first part 20A of the liner 20.

The liner 20 is positioned with the first part 20A of the liner 20 in the inner cavity 12 and the second part 20B of the liner 20 extending into the center bore 34 of the tubular body 32 adjacent the inner cavity 12. The second part 20B has an outer diameter essentially equal to the diameter of the center bore 34 of the tubular body 32 so that the second part 20B of the liner 20 can easily fit into the center bore 34 of the tubular body 32 adjacent the inner cavity 12 without extraneous side-to-side movement. In one (1) embodiment, the end of the second part 20B opposite the first part 20A is chambered to enable easier insertion into the center bore 34.

Figure 2:
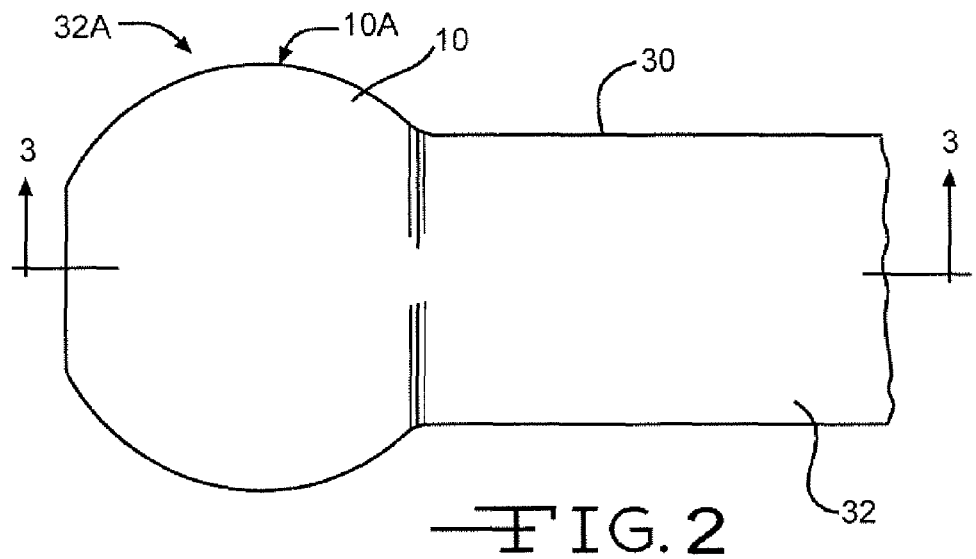
FIG. 2 is a partial view of the high pressure fuel line 30 showing the connection head 10 on one end 32A of the tubular body 32 of the fuel line 30.
Figure 2A:
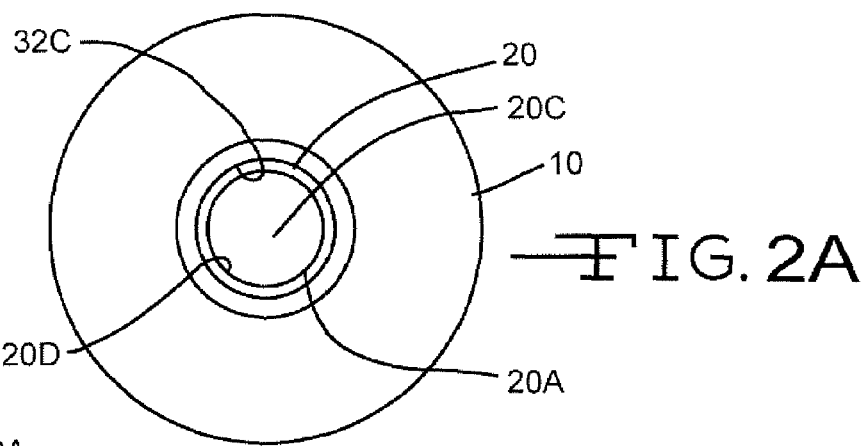
FIG. 2a is an end view of the connection head 10 showing the liner 20.

When the liner 20 is correctly positioned in the tubular body 32, the center bore 20C of the liner 20 is aligned with the center bore 34 of the tubular body 32 and the sidewall 36 of the tubular body 32 forming the outer surface 10A of the connection head 10 is positioned around essentially all of the first part 20A of the liner 20 except for the opening 20D of the center bore 20C of the liner 20. In one (1) embodiment, the sidewall 36 does not extend over the entire first part 20A of the liner 20 so that the first part 20A of the liner 20 adjacent the opening 20D of the center bore 20C of the liner 20 is visible though the opening in the end 32A of the tubular body 32 having the connection head 10 (FIG. 2A). In this embodiment, the diameter of the opening 32C in the end 32A of the tubular body 32 having the connection head 10 is greater than the diameter of the center bore 20C of the liner 20. In one (1) embodiment, the diameter of the opening 32C in the end 32A of the tubular body 32 having the connection head 10 is essentially the same as the diameter of the center bore 20C of the liner 20. In one (1) embodiment, the opening 32C of the tubular body 32 is angled so that a diameter of the opening 32C adjacent the outer surface 10A of the connection head 10 is slightly greater than the diameter of the opening 32C adjacent the liner 20. In one (1) embodiment, the liner 20 is completely enclosed within the tubular body 32. When the first part 20A of the liner 20 is correctly positioned in the inner cavity 12, the distance δ between the center of the first part 20A of the liner 20 and the center of the connection head 10 of the fuel line 30 is less than 0.25 mm (FIG. 3). In one (1) embodiment, the tubular body 32 of the fuel line 30 is constructed of stainless steel. In one (1) embodiment, the tubular body 32 is constructed of 304 stainless steel. In one (1) embodiment, the liner 20 is constructed of stainless steel. In one (1) embodiment, the liner 20 is constructed of 303 stainless steel. In one (1) embodiment, where the liner 20 is used to expand the sidewall 36 of the tubular body 32, the liner 20 is constructed of 400 series stainless steel. In one (1) embodiment, the tubular body 32 has a diameter of about 7.5 mm with aسidewall 36 having a thickness of about 1.25 mm. In this embodiment, the first part 20A of the liner 20 has a diameter of about 8.32 mm. In one (1) embodiment, where the center bore 34 of the tubular body 32 has a diameter of approximately 5.0 mm, the diameter of the center bore 20C of the liner 20 is approximately 3.6 mm.

Figure 4A:
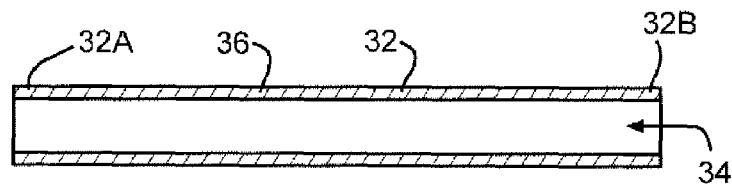
FIGS. 4A-4D show a schematic representation of the steps in one method for forming the connection head 10 in the end 32A of the tubular body 32 of the fuel line 30.

In one (1) embodiment, the sidewall 36 of the tubular body 32 is cold formed to form the connection head 10. In this embodiment, to construct the connection head 10, the tubular body 32 is secured in a clamp die 38 (FIG. 4A). The clamp die 38 has a recess 38A at one end. The tubular body 32 is positioned in the clamp die 38 so that the portion of the end 32A of the tubular body 32 used to form the connection head 10 extends into the recess 38A. In one (1) embodiment, the end 32A of the tubular body 32 extends beyond the recess 38A. The recess 38A has a shape similar to the shape of the back side of the connection head 10. In one (1) embodiment, the recess 38A has a hemispherical shape and the sidewall 36 of the tubular body 32 used to form the back side of the connection head 10 is adjacent the back wall of the recess 38A.

Figure 4B:
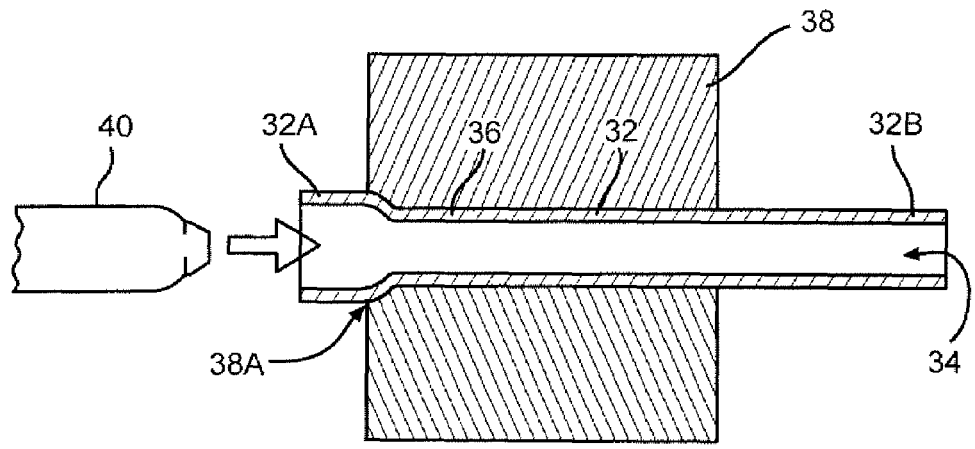
Figure 4C:
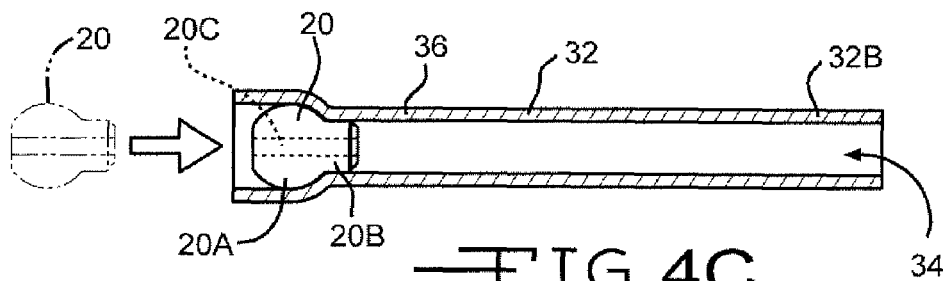
Figure 4D:
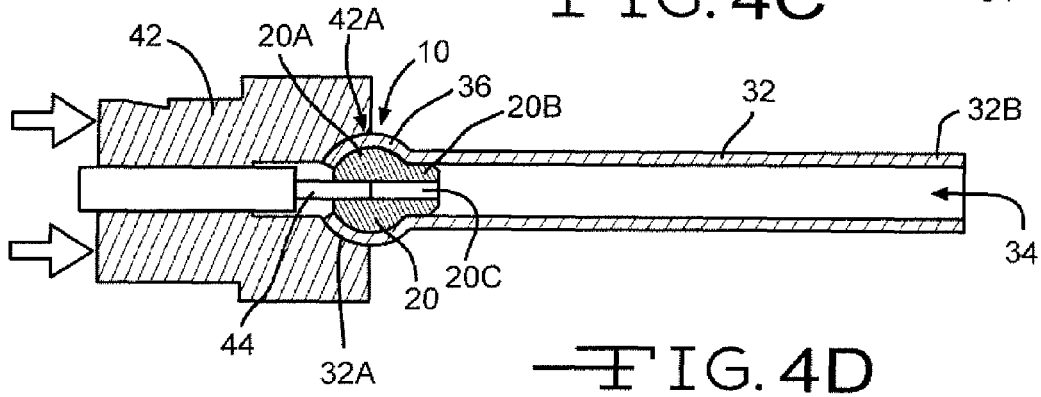

Once the tubular body 32 is securely held in the clamp die 38, an expansion punch 40 is inserted into the opening in the end of the tubular body 32 (FIG. 4B). The expansion punch 40 is moved though the opening into the center bore 34 of the tubular body 32. As the expansion punch 40 is moved into the center bore 34, the sidewall 36 of the tubular body 32 is expanded outward to accommodate the expansion punch 40. As the sidewall 36 is moved outward, the diameter of the center bore 34 at the end 32A of the tubular body 32 is expanded. In one (1) embodiment, the expansion punch 40 has an essentially cylindrical shape with a diameter essentially equal to the diameter of the first part 20A of the liner 20. The expansion punch 40 is moved into the tubular body 32 until the end of the expansion punch 40 is approximately the thickness of the sidewall 36 of the tubular body 32 away from the back wall of the recess 38A of the clamp die 38. As the expansion punch 40 moves into the recess 38A of the clamp die 38, the sidewall 36 is moved into contact with the recess 38A and the back side of the outer surface 10A of the connection head 10 is formed having the shape of the recess 38A. As the expansion punch 40 expands the sidewall 36, the inner cavity 12 is partially formed in the center bore 34 of the tubular body 32. In one (1) embodiment, the end of the expansion punch 40 is radiused so that when the end of the expansion punch 40 forms the back side of the inner cavity 12, the back side of the inner cavity 12 is radiused. When the center bore 34 of the tubular body 32 is expanded and the back side of the outer surface 10A of the connection head 10 is formed, the expansion punch 40 is removed and the liner 20 is inserted into the opening in the end 32A of the tubular body 32 (FIG. 4C).

The liner 20 is inserted into the opening in the end 32A of the tubular body 32 so that the second part 20B of the liner 20 extends into the center bore 34 of the tubular body 32 adjacent the back side of the partially formed inner cavity 12. The liner 20 is moved into the end 32A of the tubular body 32 until the back side of the first part 20A of the liner 20 contacts the back side of the inner cavity 12. In one (1) embodiment, the size and shape of the second part 20B of the liner 20 ensures that the liner 20 can only be inserted into the unexpanded center bore 34 of the tubular body 32 when the center bores 20C and 34 of the tubular body 32 and the liner 20 are aligned. When the liner 20 is correctly positioned, the front side of the first part 20A of the liner 20 is spaced inward from the end 32A of the tubular body 32.

Once the liner 20 is in position in the center bore 34 of the tubular body 32, a coin die 42 is applied to the end 32A of the tubular body 32. The coin die 42 has an recess 42A which forms the sidewall 36 of the tubular body 32 extending beyond the liner 20 over the front side of the first part 20A of the liner 20. The recess 42A has a shape similar to the shape of the front side of the outer surface 10A of the connection head 10. In one (1) embodiment, the recess 42A has a hemispherical shape. The use of the coin die 42 with the curved recess 42A and the liner 20 having a spherical outer shape enables the roundness of the outer surface 10A of the connection head 10 to be formed to an accuracy of less than 10 microns. In one (1) embodiment, when the sidewall 36 is formed over the front side of the liner 20, the liner 20 is positioned in the inner cavity 12 of the tubular body 32 so that the sidewall 36 does not extend over the center bore 20C of the liner 20. In one (1) embodiment, the sidewall 36 does not completely cover the liner 20 so that the liner 20 is visible through the opening in the end 32A of the tubular body 32 (FIG. 2A). This allows a user to quickly confirm that the connection head 10 has a liner 20. In one (1) embodiment, the coin die 42 has a pin 44 which extends into the center bore 34 at the end 32A of the tubular body 32 before the sidewall 36 is formed over the liner 20. The pin 44 prevents the sidewall 36 from extending over the opening in the liner 20, to prevent the sidewall 36 from closing the opening to the center bore 20C of the liner 20. In one (1) embodiment, the pin 44 extends into the center bore 20C of the liner 20. In one (1) embodiment, the spherical front side of the first part 20A of the liner 20 acts in conjunction with the recess 42A of the coin die 42 to create the spherical front side of the connection head 10. The smooth outer surface of the front side of the first part 20A of the liner 20 enables the sidewall 36 of the tubular body 32 to be formed into a spherical outer surface 10A and a spherical inner cavity 12. In one (1) embodiment, as the front side of the connection head 10 is formed, the inner surface of the sidewall 36 adjacent the front side of the liner 20 contacts the liner 20. In one (1) embodiment, once the connection head 10 is formed and the coin die 42 is removed, the sidewall 36 forming the front side of the connection head 10 moves slightly away from the front side of the liner 20 (FIG. 3). Once the connection head 10 is fully formed, the tubular body 32 is removed from the clamp die 38.

Figure 5A:
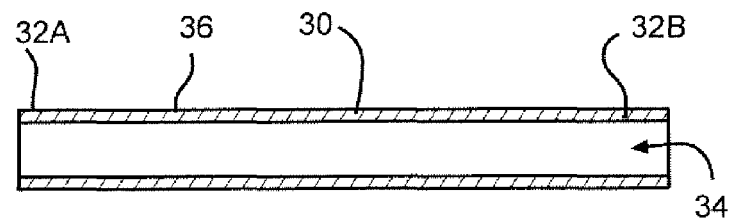
FIGS. 5A-5C show a schematic representation of the steps of an alternate method for forming the connection head 10 in the end 32A of the tubular body 32 of the fuel line 30.
Figure 5B:
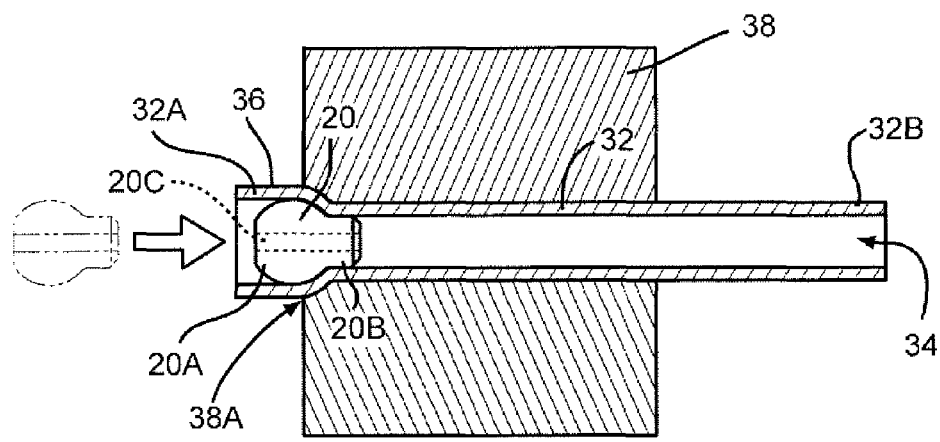
Figure 5C:
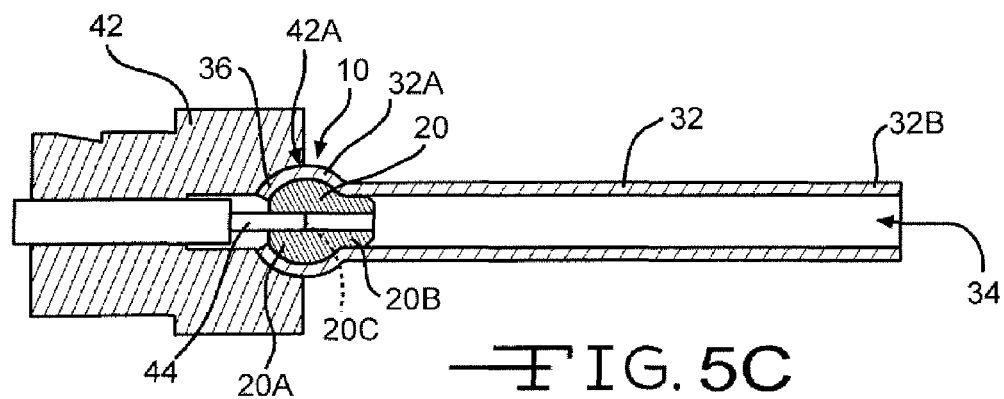

In another embodiment to form the connection head 10, the tubular body 32 is positioned in the clamp die 38 (FIG. 5A). Next the liner 20 is used to expand the center bore 34 of the tubular body 32 and move the sidewall 36 of the tubular body 32 outward to form the back side of the inner cavity 12 (FIG. 5B). In this embodiment, the second part 20B of the liner 20 is inserted through the opening 32C at the end 32A of the tubular body 32 and into the center bore 34 of the tubular body 32. A force is applied to the first part 20A of the liner 20 to move the first part 20A of the liner 20 into the center bore 34 of the tubular body 32. As the first part 20A of the liner 20 is moved into the center bore 34, the larger diameter of the first part 20A forces the sidewall 36 of the tubular body 32 to flare outward to accommodate the first part 20A of the liner 20. The liner 20 is inserted into the center bore 34 until the back side of the first part 20A of the liner 20 is spaced apart from the back wall of the recess 38A of the clamp die 38 approximately the thickness of the sidewall 36 of the tubular body 32. The sidewall 36 is then formed over the front side of the liner 20 using the coin die 42 (FIG. 5C). In this embodiment, the liner 20 can be constructed of a harder material such as 400 series stainless steel.

In use when the connection head 10 is seated against the seating surface of the connection stub of the component, the force of the locking nut pushing against the back side of the connection head 10 forces the front side of the connection head 10 into full contact with the seating surface and forms a sealed connection. When the force is applied to the outer surface 10A of the connection head 10, the liner 20 acts to provide support for the sidewall 36 forming the connection head 10 and prevents the sidewall 36 from collapsing. In one (1) embodiment, the tubular body 32 is constructed of a flexible material having memory and the sidewall 36 of the tubular body 32 is spaced apart from the front side of the first part 20A of the liner 20. In this embodiment, the force on the sidewall 36 adjacent the front side of the first part 20A of the liner 20 acting to form the sealed connection moves the sidewall 36 forming the front side of the connection head 10 inward toward the liner 20 so that the sidewall 36 contacts the liner 20.

It is intended that the foregoing description be only illustrative of the present invention and that the present invention be limited only by the hereinafter appended claims.

What is claimed is:

1. A high pressure fuel line, which comprises:
    a) a tubular body having opposed ends with an opening in each end and having a center bore extending therebetween with at least one of the ends of the tubular body having an essentially spherical outer shape with an essentially spherical inner cavity; and
    b) a liner positioned in the spherical inner cavity and having a center bore aligned with the center bore of the tubular body wherein the liner does not extend beyond the end of the tubular body.

2. The fuel line of claim 1 wherein the liner has a first part with an essentially spherical shape and a second part with an essentially cylindrical shape and wherein the first part of the liner is in the spherical inner cavity and the second part extends into the center bore of the tubular body adjacent the spherical inner cavity.

3. The fuel line of claim 1 wherein a sidewall of the tubular body adjacent the opening in the end of the tubular body having the essentially spherical outer shape does not contact the liner.

4. The fuel line of claim 3 wherein the sidewall of the tubular body is flexible, and wherein in use, when force is applied on the sidewall in a direction toward the liner, the sidewall moves and contacts the liner.

5. The fuel line of claim 1 wherein the tubular body does not completely cover the liner and the liner is visible through the opening in the end of the tubular body having the essentially spherical outer shape.

6. The fuel line of claim 1 wherein when the liner is correctly positioned in the spherical inner cavity, a center of the liner is spaced a distance of less than 0.25 mm from a center of the end of the tubular body having the spherical outer shape.

7. A method for forming a connection head on an end of a high pressure fuel line, which comprises the steps of:
    a) providing a tubular body having opposed ends with a sidewall extending therebetween and having a center bore with openings at each end;
    b) providing a liner having an essentially spherical shape and having a center bore with openings at each end;
    c) inserting the liner into the center bore of the tubular body through one of the openings in one of the ends of the tubular body so that the center bore of the liner is aligned with the center bore of the tubular body; and d) forming the sidewall at the one end of the tubular body over the liner so that the sidewall at the one end of the tubular body has an essentially spherical outer shape with an inner cavity having an essentially cylindrical shape.

8. The method of claim 7 wherein the liner has a diameter greater than a diameter of the center bore of the tubular body and wherein further in step c) the liner expands the sidewall of the tubular body outward to partially form the inner cavity.

9. The method of claim 8 wherein the liner has a second part with an essentially cylindrical shape and wherein further in step c), the liner is inserted into the tubular body so that the second part extends beyond the partially formed inner cavity into the center bore and wherein in step d) the second part prevents the liner from rotating in the inner cavity so that the center bore of the liner remains aligned with the center bore of the tubular body.

10. The method of claim 7 wherein further in step c), the sidewall of the tubular body at the one end is expanded outward to partially form the inner cavity prior to insertion of the liner.

11. The method of claim 10 wherein further in step c), an expansion punch having a radiused end is inserted into the center bore of the tubular body to expand the sidewall to partially form the inner cavity and wherein an end of the inner cavity opposite the opening in the tubular body is radiused.

12. The method of claim 7 wherein the liner has a first part with an essentially spherical shape and a second part with an essentially cylindrical shape and wherein in step c), the liner is inserted into the opening in the end of the tubular body so that the second part enters the center bore of the tubular body before the first part enters the center bore of the tubular body.

13. The method of claim 12 wherein a size and shape of the second part of the liner is essentially similar to a size and shape of the center bore of the tubular body so that in step c), the second part of the liner extends into the center bore of the tubular body without expanding the sidewall of the tubular body.

14. The method of claim 7 wherein further in step d), a coin die having an arcuate surface is used to form the sidewall over the liner.

15. The method of claim 7 wherein further in step d), when the sidewall is formed over the liner, the sidewall does not contact the liner adjacent the opening in the end of the tubular body.

16. The method of claim 7 wherein further in step c), the liner is inserted a distance from the end of the tubular body so that in step d), the sidewall extends over the liner to adjacent the opening of the center bore of the liner.

17. The method of claim 7 wherein further in step c), the liner is positioned in the center bore of the tubular body so that further in step d), the liner is spaced from the end of the tubular body essentially a thickness of the sidewall of the tubular body.

18. The method of claim 7 wherein further in step d), the opening in the end of the tubular body adjacent the liner has a diameter essentially equal to a diameter of the center bore of the liner.

19. The method of claim 7 wherein further in step c), a back side of the essentially spherical connection head is formed.

20. The method of claim 7 wherein further in step d), a front side of the essentially spherical connection head is formed.

21. A high pressure fuel line, which comprises:

a) a tubular body having opposed ends with an opening in each end and having a center bore extending therebetween with at least one of the ends of the tubular body having an essentially spherical outer shape with an essentially spherical inner cavity; and b) a liner positioned in the spherical inner cavity and having a center bore aligned with the center bore of the tubular body wherein a sidewall of the tubular body adjacent the opening in the end of the tubular body having the essentially spherical outer shape does not contact the liner.

* * * * *